United States Patent [19]

Fletcher et al.

[11] 4,052,659
[45] Oct. 4, 1977

[54] OVERLOAD PROTECTION SYSTEM FOR POWER INVERTER

[76] Inventors: James C. Fletcher, Administrator of the National Aeronautics and Space Administration, with respect to an invention of Satoshi Nagano, Long Beach, Calif.

[21] Appl. No.: 742,034

[22] Filed: Nov. 15, 1976

[51] Int. Cl.² .............................................. H02M 1/18
[52] U.S. Cl. ........................................ 363/57; 363/89
[58] Field of Search .............. 307/64, 65, 66; 321/11, 321/14, 18, 27 R, 27 MS; 361/91

[56] References Cited

U.S. PATENT DOCUMENTS

| | | | |
|---|---|---|---|
| 3,249,769 | 5/1966 | Mierendorf | 307/64 X |
| 3,668,509 | 6/1972 | Riebs et al. | 321/18 |
| 3,979,644 | 9/1976 | Everhart | 323/17 X |

*Primary Examiner*—William M. Shoop
*Attorney, Agent, or Firm*—Monte F. Mott; Paul F. McCaul; John R. Manning

[57] ABSTRACT

An overload protection system for a power inverter utilizes a first circuit for monitoring current to the load from the power inverter to detect an overload and a control circuit to shut off the power inverter when an overload condition is detected. At the same time a monitoring current inverter is turned on to deliver current to the load at a very low power level. A second circuit monitors current to the load from the monitoring current inverter to hold the power inverter off through the control circuit unitl the overload condition is cleared so that the control circuit may be deactivated in order for the power inverter to be restored after the monitoring current inverter is turned off completely.

10 Claims, 3 Drawing Figures

OVERLOAD PROTECTION SYSTEM FOR POWER INVERTER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435 U.S.C. 2457).

BACKGROUND OF THE INVENTION

This invention relates to power inverters, and more particularly to an overload protection system for use with power inverters.

Power supply systems employing inverters require automatic overload protection circuits to safeguard not only the expensive inverter components, but also the environment of the load. Once the overload condition has been corrected, operation of the inverter should be restored automatically. This is particularly desirable in aerospace applications where a simple fuse for overload protection cannot be used because it is not convenient, or sometimes possible, to reset or replace the fuse. But even in applications where there is no inconvenience in resetting a fuse, such as in a solor energy system for home use or in an electric vehicle, it would be desirable to safeguard the power inverter by automatically shutting the inverter down during any overload condition that may be specified. Once the overload condition has been corrected, the operation of the inverter should be restored automatically. This not only satisfies safety requirements, but assures reliability of the inverter and its power supply such as solar cells or batteries. Moreover, this conserves power. Reliability and conservation of power are both very important in aerospace applications and civil system applications where the inverter is expected to resume operation once the overload condition has been cleared, and there is limited power available.

Several circuit arrangements have been devised to provide overload protection. One frequently used arrangement employs a current-limiting feedback loop. During normal operation, the power supplied to power switching transistors from the power source passes through a low resistance path consisting of a series transistor and resistor to the centertap of the primary of the inverter transformer. Initial current flows through another higher impedance path to allow operation of the inverter transistors. As the AC voltages in the inverter increase, a rectified voltage is developed capable of driving series transistor into saturation. Thus only the low resistance of the fully turned on series transistor and resistor limits current flow to the inverter transistors.

A high surge current resulting from an overload or short circuit increases the voltage drop across the series resistor and this biases a second transistor into conduction to supply current to the inverter through a much larger series resistor and to drive the first series transistor into cutoff. Current flow to the inverter transistors is thus throuugh a much higher resistance path, thereby limiting current to a safe value.

One disadvantage of this arrangement is that when the load current is at a nominal level, the first series transistor and resistor constantly dissipate power. This produces a considerable decrease in efficiency of the power inverter. Another disadvantage of the arrangement is that under some overload conditions, the developed back-bias is not sufficient to effect complete cutoff of first the series transistor. Stress applied to this first series transistor under such overload conditions may thus cause damage.

Another frequently used protection circuit is of the active overload protection type. An overload sampling circuit operates generally in a manner similar to a monostable multivibrator or one-shot. Under normal operating conditions the protection circuit remains in a rest state similar to that of the untriggered state of a one-shot. Current surges produced by overloading or shorting are monitored by a current sensor in series with the load. The rectified voltage produced therefrom is compared with a reference voltage to generate an error signal. Under appropriate conditions, the error signal controls the output of a one-shot multivibrator to inactivate the clock pulse generator for a period which is determined by the time constant of the one-shot. The state of the load is reexamined cyclically until the abnormal condition is cleared, following which inverter operation resumes.

One disadvantage of this arrangement is the tendency to produce system oscillation, which is accompanied by periodic generation of high current spikes. The spikes radiate intolerable noise to adjacent equipment susceptible to such noise. Moreover, the power switching devices of this system are exposed to very high stress conditions periodically because of high current spikes during overload which cause premature failures of components. Another disadvantage is that since the time constant of the overload protection circuit if fixed, normal operation is not resumed immediately on clearance of the abnormal condition. If a very short time constant is chosen to offset this limitation, the resulting frequency of oscillation is very high, radiating even more undesirable noise.

OBJECTS AND SUMMARY OF THE INVENTION

An object of this invention is to provide an automatic overload protection system which continually monitors load current to detect an overload condition, and automatically suspends operation of the inverter.

A further object is to provide an automatic overload protection system which provides a small current to the load, once an overload condition has been detected and operation of the inverter has been suspended, and which monitors this current to the load to determine when the overload condition has been cleared to automatically allow operation of the inverter to resume.

These and other objects and advantages of the present invention are achieved in a power inverter with a novel overload protection circuit comprising means for producing a load signal proportional to the load current and a first comparing means for comparing the load signal thus produced with a first reference level. When the load signal exceeds this level, the output of the first comparing means actuates control means for shutting the power inverter off and turning a monitoring current inverter on to supply a small current to the load sufficient to detect when the overload condition has been cleared. The combination further includes means for producing a monitoring signal proportional to the monitoring current to the load and a second comparing means for comparing the monitoring signal with a second reference level. When the monitoring signal no longer exceeds this second reference level, the output of the second comparing means deactivates the control means, thus restoring the power inverter operation and terminating operation of monitoring current inverter off.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
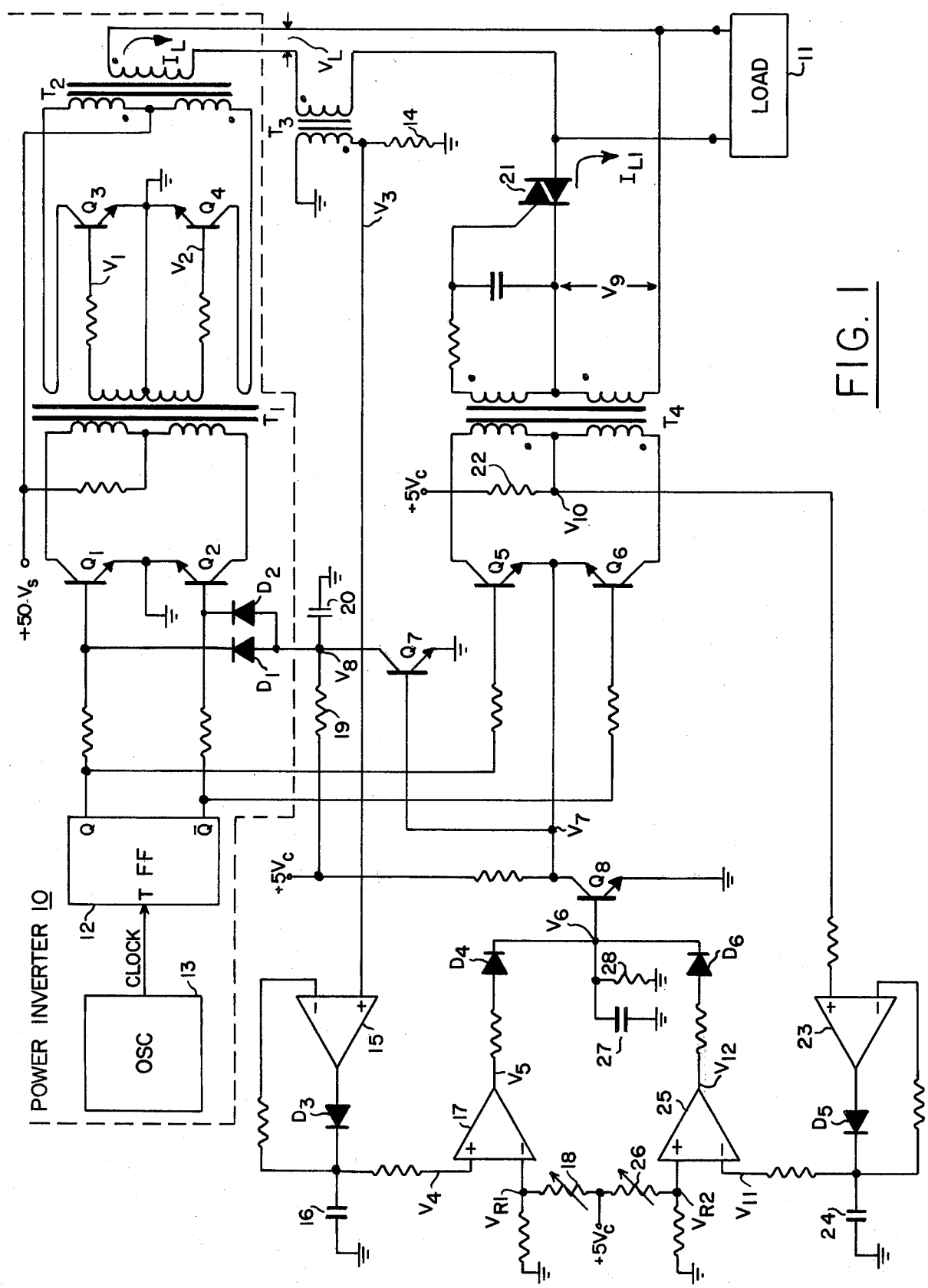
FIG. 1 is a circuit diagram of the present invention connected to a conventional power inverter.

Referring to FIG. 1, a conventional power inverter 10 is shown for converting DC voltage from a source ($+50V_s$) into AC voltage applied to a load 11. The inverter is comprised of a pair of buffer transistors $Q_1$ and $Q_2$ which drive a pair of power transistors $Q_3$ and $Q_4$ through a transformer $T_1$. The buffer transistors are switched on alternately by the true (Q) and complementary ($\overline{Q}$) outputs of a T-type flip-flop 12 triggered by the output of a free running oscillator 13. Power is delivered to the load by the transistors $Q_3$ and $Q_4$ through a transformer $T_2$.

Whenever transistors $Q_1$ and $Q_2$ are both on at the same time, the core of the transformer $T_1$ saturates and thus inhibits inverter operation until normal switching resumes. This feature is sometimes used for regulation of DC voltage delivered to the load. That is done by feedback control of the overlap of the buffer transistors, thus effectively controlling the duty cycle of each. In this exemplary embodiment, DC voltage regulation is not included, although it could be; that is transistors $Q_1$ and $Q_2$ could be duty-cycle cntrolled, and the load could include rectifiers and filters. The fact that turning on both buffer transistors suspends operation of the inverter for so long as both transistors are held on is used to automatically shut the inverter down when an overload condition is detected, and to automatically restore the inverter operation once the overload condition has been cleared. That is accomplished through control of bias current applied to the base of the transistors $Q_1$ and $Q_2$ through diodes $D_1$ and $D_2$ which turns both transistors on once an overload condition is detected. When it is detected that the overload condition has been cleared, the diodes are reverse biased to permit the flip-flop 12 to resume switching the transistors on alternately.

The circuit for detecting an overload condition includes a current transformer $T_3$ having its primary in series with the load and its secondary connected to a resistor 14. Under normal conditions the current through the resistor 14 produces a voltage which, when peak detected, does not exceed a reference voltage. Under those conditions, transistors $Q_5$ and $Q_6$ are both held off, and a transistor $Q_7$ is held on by the collector voltage of a transistor $Q_8$, which is itself held cut off.

The load peak detection is accomplished by a circuit comprised of an operational amplifier 15, diode $D_3$ and capacitor 16. The amplifier and diode amplify and rectify the load signal voltage, while the capacitor 16 filters the rectified load signal to provide a DC signal proportional to the peak load current. That DC signal is coupled to a comparator comprised of a differential amplifier 17. A potentiometer 18 connected to a source of control voltage ($+5V_c$) is set to the reference level that defines an overload condition. When that level is exceeded by the DC signal from the load signal peak detector, the output of the comparator switches to +5V, thus forward biasing a diode $D_4$ to turn the transistor $Q_8$ on. Its collector voltage then drops to virtually circuit ground (OV) to allow the transistors $Q_5$ and $Q_6$ to be alternately switched on by the flip-flop 12. At the same time, the transistor $Q_7$ is turned off, thus permitting the diodes $D_1$ and $D_2$ to be forward biased by the control voltage ($+5V_c$) via a resistor 19. A filter capacitor 20 is quickly charged to the positive potential between the resistor 19 and the diodes to turn both of the transistors $Q_1$ and $Q_2$ on. With both transistors turned on, the core of the transformer $T_1$ saturates, thus inhibiting the inverter operator as long as the $+5V_c$ bias is maintained over the resistor 19 to forward bias the diodes $D_1$ and $D_2$.

The circuit for detecting when an overload condition has been cleared includes a signal transformer $T_4$ which is connected in parallel with the load 11 through a triac 21 which consists essentially of two oppositely poled silicon-controlled rectifiers connected to common input and output terminals with a common gate terminal. The triac isolates the load from the transformer $T_4$ except when power is not being delivered to the load by the transformer $T_2$, and the transistors $Q_5$ and $Q_6$ are operating to provide a small signal to the load that may be monitored. The AC signal produced by operation of the transistors $Q_5$ and $Q_6$ alternately turns on each side (section) of the triac. Thus, when the signal is present, the triac conducts continuously.

The power to the signal inverter is supplied by the control voltage source ($+5V_c$) through a resistor 22 to the centertap of the primary of the transformer $T_4$. As long as the overload condition exists, the signal inverter will deliver current to the load at some level, which is low as compared to the current normally delivered by the power inverter, but which is sufficient to produce a large voltage drop across the resistor 22. The potential ($V_{10}$) of the center tap of the transformer $T_4$ is lower than the control voltage supply ($5V_c$) as much as the voltage drop across the resistor 22. This voltage ($V_{10}$) is applied to a second peak detector comprised of an operational amplifier 23, diode $D_5$ and capacitor 24. The output of that peak detector is applied to a second comparator 25. The other input to the comparator is a positive reference voltage set by means of a potentiometer 26. The output of the comparator produces a high output (+5V) as long as the overload condition exists. That high output will continue to hold the transistor $Q_8$ on. A capacitor 27 at the base of transistor $Q_8$ holds the transistor on for a predetermined period after an overload condition is detected until the output of the comparator 25 can take over and hold the transistor on.

Once the overload condition is cleared, the signal voltage across the resistor 22 drops (due to decreased current demand by the load) causing the transformer ($T_4$) center-tap voltage to increase. When it increases beyond the reference level set by the potentiometer 26, the output of the comparator 25 drops to virtually zero, thus reverse biasing a diode $D_6$. The positive potential stored in the capacitor 27 will discharge through the base-emitter junction of transistor $Q_8$ until it can no longer be held on. Any residual charge in the capacitor will discharge through a resistor 28 and transistor $Q_8$ base-emitter junction. Once the transistor $Q_8$ is again turned off in this manner, the transistors $Q_5 Q_6$ are cut off, thus shutting down the signal inverter soon after it is detected that the overload condition has been cleared. At the same time the transistor $Q_7$ is turned on again. The capacitor 20 at the collector of the transistor $Q_7$ holds the power inverter off for a predetermined period while its charge is discharged through the transistor $Q_7$ to assure that the power inverter is not turned on until the signal inverter is completely turned off.

The maximum power dissipated by the signal inverter is limited to a few watts by the resistor 22 (typically 8 ohms) and the control voltage (+5$V_c$). Consequently little power is consumed in monitoring the overload condition, and the monitoring signal will not damage the load or present a hazard at the load to persons or the environment of the load.

Figure 2:
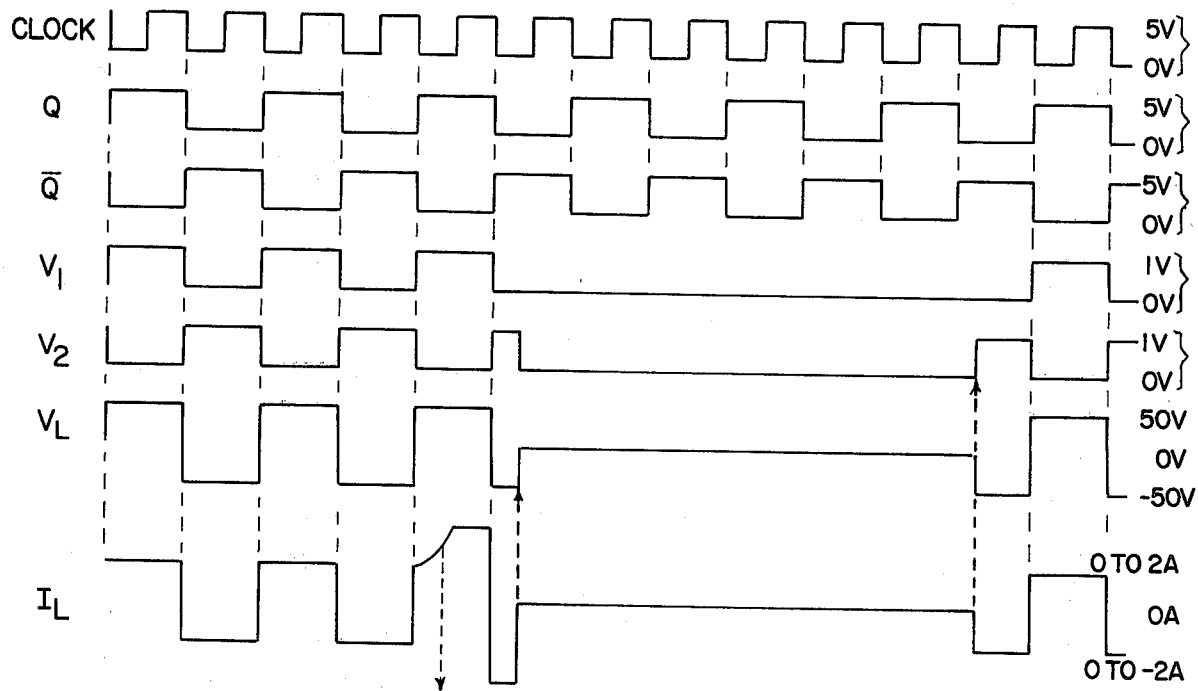
FIG. 2 is a waveform diagram illustrating operation of the conventional inverter shown in FIG. 1.

Operation of the overload detection and protection circuit will not be described with reference to a waveform diagram in FIG. 3, but first waveforms of the power inverter will be described with reference to FIG. 2 which shows voltage waveforms at points in the circuit correspondingly labeled. Waveforms Q and $\bar{Q}$ are the complementary square waveforms provided to the control transistors $Q_1$ and $Q_2$ by the flip-flop 12 in response to clock pulses from the oscillator 13. Waveforms $V_1$ and $V_2$ are the control signals applied to the base electrodes of the power transistors $Q_3$ and $Q_4$, first during normal operation for two cycles of the flip-flop 12 and then during an overload condition detected in the third cycle of the flip-flop. Waveforms $V_L$ and $I_L$ are the waveforms of voltage and current applied to the load. The overload is indicated by a rise in the load current as shown in the third cycle of that waveform in FIG. 2. Once this overload is detected, operation of the power transistors is suspended, as will be further described with reference to FIG. 3. Then after the overload condition is cleared, operation of the power transistors is resumed automatically.

Figure 3:
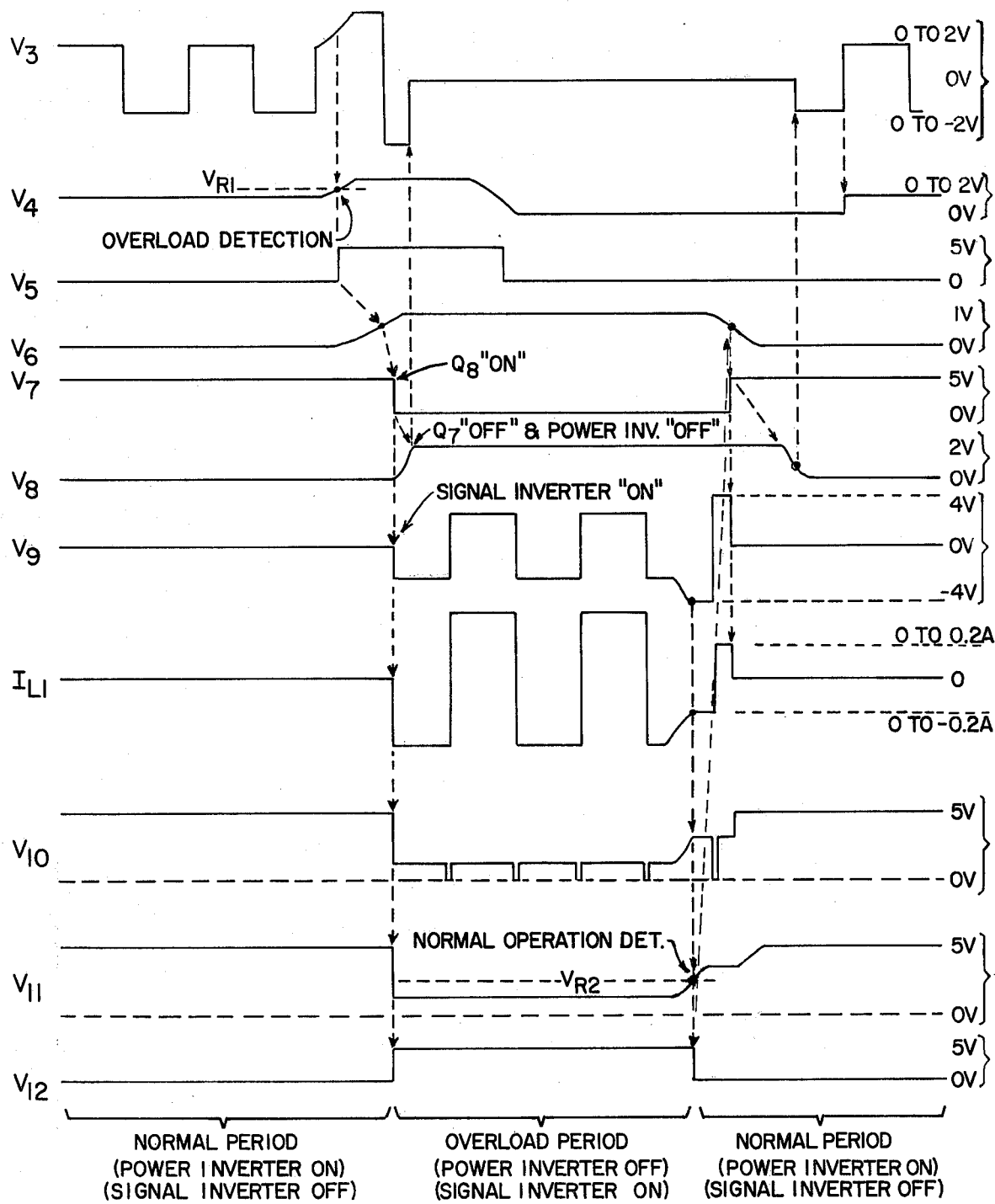
FIG. 3 is a waveform diagram illustrating operation of the present invention shown in FIG. 1.

Referring now to FIG. 3, in which voltage waveforms shown are at points in the circuit correspondingly labeled, the voltage sensed across resistor 14 is shown in waveform $V_3$. (It naturally follows the waveform of the load current $I_L$.) That voltage waveform is peak detected to produce a DC load signal $V_4$ at the noninverting input (+) of the comparator 17. As that load signal increases due to an overload condition, it crosses a reference voltage, $V_{R1}$, at the inverting input, as shown in the second waveform of FIG. 3. Once that occurs, the output, $V_5$, of the comparator increases from 0 to +5V, as shown in the third waveform. That positive step charges the capacitor 27 to drive the voltage, $V_6$, applied to the base of the transistor $Q_8$ from 0 to +5V as shown by the fourth waveform. The collector voltage, $V_7$, of the transistor $Q_8$ then drops to virtual ground as shown in the fifth waveform. Once the transistor $Q_8$ is turned on in that manner, the collector voltage, $V_8$, of the transistor $Q_7$ increases to +5V as the transistor $Q_7$ is turned off to shut down the power inverter.

The 0-volt level of the waveform $V_7$ allows the transistors $Q_5$ and $Q_6$ to be alternately switched on by the flip-flop 12, thus turning the signal inverter on to produce a signal, $V_9$, across the load at some low level, typically ±3V, as shown in the seventh waveform of FIG. 3, for the period of the overload condition. Once the overload condition is corrected (e.g., once a short circuit in the load is removed) the output of the signal inverter will increase to typically ±4 volts, as shown in the waveform of the signal $V_9$.

As the output voltage of the signal inverter increases from zero to ±4V during an overload condition, the voltage drop across the resistor 22 increases correspondingly due to operation of the transistors $Q_5$ and $Q_6$. The result is a signal voltage, $V_{10}$, coupled to the peak detector which drops from ±5$V_c$ to about +1V, with switching transients to 0V each time the transistors are switched. The output, $V_{11}$, of the peak detector is a monitoring signal coupled to the inverting input of the comparator 25 for comparison with a reference voltage, $V_{R2}$. When the monitoring signal, $V_{11}$, drops below the reference $V_{R2}$, the comparator output, $V_{12}$, increases from 0V to +5V. Diode $D_6$ couples this high level of the signal $V_{12}$ to the base of the transistor $Q_8$ to hold it on, even after the output of the comparator 17 drops to zero, until the overload condition is cleared. At that time the signal $V_{11}$ will cross the reference $V_{R2}$, and the signal $V_{12}$ will drop to zero. However, the transistor $Q_8$ will not turn off immediately due to the charge stored in the capacitor 27 holding the signal $V_6$ up. As that signal $V_6$ decays, a point will be reached where the base-emitter junction of the transistor $Q_8$ is insufficiently forward biased for the transistor to conduct. At that point the transistor $Q_8$ is turned off, but the transistor $Q_7$ is not turned on completely until the capacitor 20 is discharged.

When the collector voltage, $V_8$, of the transistor $Q_7$ reaches a level insufficient to forward bias the diodes $D_1$ and $D_2$, the operation of the power inverter resumes. This delay in turning the power inverter on allows a brief period for shutting down the signal inverter before resuming operation of the power inverter. In that manner, the overload detection and control circuits automatically shut down the power inverter upon detecting an overload, and automatically turns the power inverter back on upon detecting that the overload condition is cleared. In the meantime, very little power (about 0.2 amperes at 5 volts of control voltage) is delivered to the load so that no damage can occur to the power inverter which normally operates with about 2 amperes at 50 volts in this example. Any operating personnel or equipments involved in clearing the overload are also protected by this low overload monitoring signal level.

Although only the positive value ($V_3$) of the current transformer ($T_3$) is used to detect the overload current in this configuration, it is possible to use either polarity of the output by having a bridge rectifier across the output winding of this current transformer. This will enable the circuit to detect overload conditions of both phases of power inverter operation.

Although a particular embodiment of the invention has been described and illustrated herein, it is recognized that modifications and variations may readily occur to those skilled in the art. It is therefore intended that the claims be interpreted to cover such modifications and variations.

What is claimed is:

1. An overload protection system for a power inverter comprising
    means for producing a load signal proportional to current delivered by said inverter to a load,
    first comparing means for comparing said load signal with a first predetermined reference level specifying the onset of an overload condition, a signal inverter for producing a small monitoring current through said load, means for producing a monitoring signal proportional to said monitoring current through said load, second comparing means for comparing said monitoring signal with a second predetermined reference level specifying the continuation of an overload condition, and control means responsive to said first and second comparing means for shutting said power inverter off and turning said signal inverter on once said power signal exceeds said first predetermined reference level and thereafter while said monitoring signal exceeds said second predetermined reference level, and for shutting said signal inverter off and turning said power inverter on once said monitoring signal does not exceed said second predetermined reference level.

2. The combination of claim 1 wherein said control means includes means for holding said power inverter off for a predetermined period after an overload condition is detected while said signal inverter develops a monitoring signal for comparison with said second reference signal to thereby continue to hold said power inverter off continously, once said overload condition is detected until the overload condition has been cleared.

3. The combination of claim 2 wherein said control means includes means for holding said power inverter off after an overload condition has been cleared for a predetermined period which will assure the signal inverter is turned off before the power inverter is turned on.

4. The combination of claim 1 wherein said signal inverter is connected in parallel with said power inverter by means for isolating said signal inverter from said power inverter during operation of said power inverter under normal load conditions.

5. The combination of claim 1 wherein said means for producing a monitoring signal is comprised of a transformer having a secondary winding with first and second end terminals and a center tap, a triac having input and output terminals connected in series between said center tap and one terminal of said load, respectively, and having a gate terminal connected to said first end terminal of said transformer through a resistor, a capacitor connected between said gate terminal and said input terminal of said triac, and means for connecting said second end of said transformer to another terminal of said load.

6. The combination of claim 5 wherein said means for producing a load signal proportional to current delivered by said power inverter is comprised of a current transformer having a primary winding connected in series between said one terminal of said load and an output terminal of said power inverter, and a secondary winding having one terminal connected directly to circuit ground and another terminal connected through a resistor to circuit ground, said other terminal being connected to said first comparing means.

7. The combination of claim 1 wherein said power inverter is comprised of an output transformer having a tapped primary winding with a center tap connected to a source of DC voltage and end terminals connected to circuit ground by power transistors, each having its collectors connected to a separate end terminal of said primary winding and its emitter connected to circuit ground, a control transformer having center-tapped primary and secondary windings, each half of the center tap of the seconary winding being connected between the base of separate one of said power transistors and circuit ground, and a pair or control transistors, each one having its collector connected to a different end of said primary winding of said control transformer, its emitter connected to circuit ground and its base connected to means for turning said control transistors on alternately, and wherein said control means for shutting said power inverter off and turning said signal inverter on includes a pair of diodes, each diode connected to the base of a separate one of said control transistors for forward current through the base-emitter junction of the connected control transistor, means for reverse biasing both of said diodes, and means for switching said reverse biasing means to forward bias said diodes once said power signal exceeds said first predetermined reference level and thereafter while said monitoring signal exceeds said second predetermined level, thus turning on both control transistors to shut off said power inverter.

8. The combination of claim 7 wherein said last named means includes a control switching transistor having its emitter connected to circuit ground, its collector connected to a source of control voltage and its base connected to the outputs of said first and second comparing means through separate buffer diodes, whereby said first comparing means switches said control switching transistor from one conductive state to another once said power signal exceeds said first reference level and said second comparing means holds said control switching transistor in said other state while said monitoring signal exceeds said second predetermined level.

9. The combination of claim 8 including a capacitor connected between said base of said control switching transistor and circuit ground to hold said control switching transistor in its other state until said second comparing means can take over and hold it in its other state for so long as said monitoring signal exceeds said second predetermined reference level.

10. The combination of claim 9 including a capacitor connected to a junction between said pair of diodes and said reverse biasing means to hold forward bias on said diodes after said control switching transistor is returned to its first state, upon said monitoring signal no longer exceeding said second predetermined reference level, until said means for producing a monitoring signal is turned off.

* * * * *